March 23, 1954  F. MAKARA  2,672,864
AUDIO MASK
Filed July 18, 1951
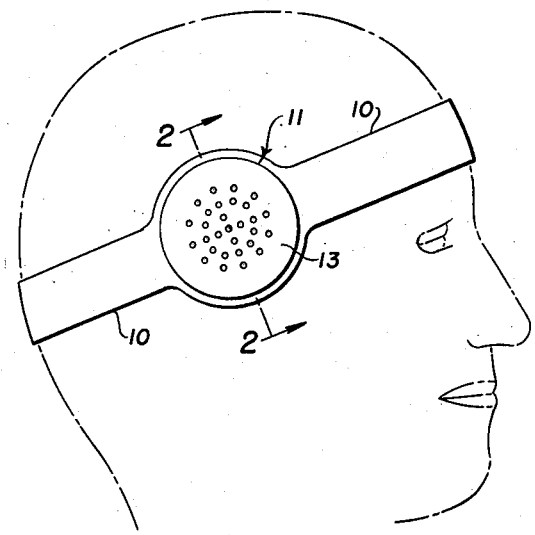
Fig. 1
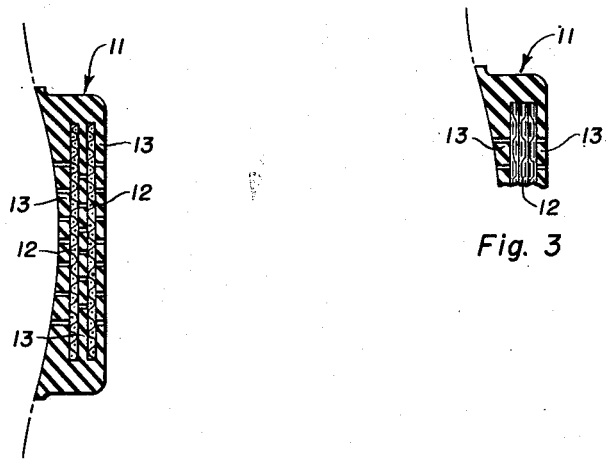
Fig. 2
Fig. 3
INVENTOR.
Frank Makara Patented Mar. 23, 1954

2,672,864

UNITED STATES PATENT OFFICE 2,672,864

AUDIO MASK

Frank Makara, Seaford, N. Y.

Application July 18, 1951, Serial No. 237,421

6 Claims. (Cl. 128—152)

This invention relates to audio masks, and more particularly to masks to prevent or to reduce in intensity the passage of sound waves to the eardrums.

The invention is particularly useful to dampen the shock wave of noise occurring from percussion, in contrast to din or hum type noises.

It is a purpose of this invention to prevent or reduce in intensity the transmission of shock waves to the tympanum or ear-drum.

It is also a purpose of this invention to provide an ear or audio mask comfortable to wear and inexpensive to manufacture.

Other purposes or objects will be apparent upon reading the following disclosure.

This invention is illustrated by way of an embodiment as shown in the accompanying drawing in which, Fig. 1 is a perspective view showing the mask on a wearer's head, Fig. 2 is a cross-section taken along line 2—2 of Fig. 1 showing alternate layers of pliable woven mesh and pliable perforated plastic film, and, Fig. 3 is a cross-section taken along line 2—2 of Fig. 1 showing a plurality of woven flat plastic mesh superimposed upon one another.

According to this invention the energy of sound waves is absorbed by traversing through a plurality of minute openings in plastic woven meshes or plastic films preferably not in register.

The openings or interstices of the plastic film or woven wire are minute, in order that the air-pressure over the eardrum or tympanum may attain normal or atmospheric pressure, yet these openings are small enough to act as valves which close or substantially close on being vibrated by sound waves said closing being effected by the vibration of the walls of said openings or interstices.

While the above theory of operation may not be exact, being only a theory of operation, nevertheless my invention effectively eliminates or reduces the energy of a percussion or shock wave so that the tympanum is not injured.

My invention is especially useful for light sleepers who are easily awakened by city noises of a concussion type such as auto horns, bumped garbage cans and the like.

However the invention is also useful when worn by artillery personnel or when worn by factory workers when there is a large amount of factory din or noise due to the method of manufacture.

Turning to Figures 1 to 3 inclusive an elastic or rubber head-band 10 is fitted with two ear-cups 11. The elastic band 10 may be placed about the head so that it grasps the forehead and back of the head as shown in Fig. 1 or it may be placed so that it surrounds the head by passing under the chin and over the top or dome of the wearer's head (not shown). The invention comprises fusing together or otherwise bonding plastic wire mesh 12 with plastic perforated film 13, or by fusing together or otherwise bonding together a plurality of fine mesh plastic wire or relatively thin perforated plastic film. The mesh or openings per square inch may vary considerably but preferably I may use wire mesh or perforated film having about 100 to 400 or more openings per square inch. The thickness of the wire mesh or perforated film also may vary but a thickness of about one-thousandth of an inch to about five-hundreths of an inch are preferred.

The plastic material from which the outer ear-wall or sound damper unit is prepared may be nylon, polymerized vinyl chloride, cellulose acetate, or any other synthetic plastic. Preferably the plastic is rendered pliable by the use of plasticizers such as for example octyl phthalate, decyl phthalate and the like, said plasticizers having at least one hydrocarbon unit of high molecular weight.

Clearly many variants may be had of the above invention without departing from the spirit thereof, since metal wire or textile meshes are also operable. Obviously this invention relates to a novel means for absorbing sound shock waves and is to be limited only by the scope of the claims appended hereinafter.

The scope of the claims are intended to embrace flat wires as well as round wire and wire of any other cross-section. Manifestly the scope of the claims embraces films and wire having minute opening, and the smaller the opening the more effective becomes the audio valve effect, so that openings of over 400 per square inch are preferred for an audio mask intended to prevent injury to the ear-drum from sharp blasts such as of an atomic nature. Also the scope of the claims is intended to embrace sound dampening outer-walls of ear-cups 11 wherein wire mesh is used to re-inforce the plurality of pliable plastic material.

I claim:

1. An apparatus for substantially eliminating noise comprising a headband, and a pair of ear-cups disposed in said headband and having a plurality of superimposed synthetic plastic material having minute interstices therein, said plurality of plastic material consisting of alternate layers of finely woven plastic wire or mesh with plastic film having a plurality of holes therein, the holes of said film being substantially off-center from the openings of the wire mesh.

2. An apparatus for substantially eliminating noise, comprising a headband, and a pair of ear-cups disposed in said headband and having a plurality of superimposed synthetic plastic wire mesh fused in said ear-cups and constituting the outer wall thereof, whereby the energy of sound waves is absorbed within the openings of said plurality of wire mesh.

3. An apparatus for substantially eliminating noise comprising a headband, and a pair of ear-cups disposed in said headband and having a plurality of superimposed synthetic perforated plastic films the perforations of which are substantially off-register whereby the air pressure over the ear-drum is maintained at atmospheric pressure while absorbing the energy of the sound waves in the course of their zig-zag travel through the perforations of said plastic films.

4. The apparatus of claim 2 wherein the plastic wires have a mesh of from about 100 openings per square inch to over 400 openings per square inch.

5. The apparatus of claim 3 wherein the perforated plastic films have a thickness of about one-thousandth of an inch to about five-hundredths of an inch and wherein the perforations are from about 100 to about 400 per square inch.

6. The apparatus of claim 2 where the wires have a flat cross-section.

FRANK MAKARA.

References Cited in the file of this patent

UNITED STATES PATENTS

| Number | Name | Date |
|---|---|---|
| 1,148,849 | Mallock | Aug. 3, 1915 |
| 1,599,961 | Hall et al. | Sept. 14, 1926 |
| 1,804,688 | Harrison | May 12, 1931 |
| 1,816,769 | Fisk | July 28, 1931 |
| 2,437,049 | Salisbury | Mar. 2, 1948 |
| 2,470,597 | Woodward | May 17, 1949 |

FOREIGN PATENTS

| Number | Country | Date |
|---|---|---|
| 632 | Great Britain | Dec. 23, 1909 |
| 385,082 | Great Britain | Dec. 22, 1932 |